(12) United States Patent
Jackson et al.

(10) Patent No.: US 6,633,821 B2
(45) Date of Patent: Oct. 14, 2003

(54) SYSTEM FOR SENSING FACTORY WORKSPACE

(75) Inventors: Warren B. Jackson, San Francisco, CA (US); Sudhendu Rai, Fairport, NY (US); Feng Zhao, Campbell, CA (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/756,455

(22) Filed: Jan. 8, 2001

(65) Prior Publication Data

US 2002/0091491 A1 Jul. 11, 2002

(51) Int. Cl.[7] .............................................. G06F 19/00
(52) U.S. Cl. ......................................... 702/56; 702/183
(58) Field of Search ............................ 702/183, 185, 702/56; 235/376; 709/238; 704/275; 101/477; 340/10.1, 572.4, 572.1; 116/308; 395/200; 700/275; 358/1.5

(56) References Cited

U.S. PATENT DOCUMENTS

| | | | | |
|---|---|---|---|---|
| 3,862,615 A | * | 1/1975 | Liou ........................... 116/308 |
| 4,683,542 A | * | 7/1987 | Taniguti ....................... 702/56 |
| 5,539,864 A | * | 7/1996 | Hauck et al. ................. 358/1.5 |
| 5,566,092 A | * | 10/1996 | Wang et al. ................. 702/185 |
| 5,689,238 A | * | 11/1997 | Cannon et al. ............ 340/572.1 |
| 5,790,789 A | * | 8/1998 | Suarez ........................ 395/200 |
| 5,869,820 A | * | 2/1999 | Chen et al. .................. 235/376 |
| 5,963,884 A | | 10/1999 | Billington et al. ............. 702/56 |
| 5,995,006 A | | 11/1999 | Walsh ....................... 340/572.7 |
| 5,995,910 A | * | 11/1999 | Discenzo ...................... 702/56 |
| 6,107,910 A | * | 8/2000 | Nysen ........................ 340/10.1 |
| 6,161,480 A | * | 12/2000 | Pfizenmaier ................. 101/477 |
| 6,199,044 B1 | * | 3/2001 | Ackley et al. ............... 704/275 |
| 6,232,870 B1 | * | 5/2001 | Garber et al. ............... 340/10.1 |
| 6,295,510 B1 | * | 9/2001 | Discenzo ..................... 702/183 |
| 6,335,686 B1 | * | 1/2002 | Goff et al. ................. 340/572.4 |
| 6,356,949 B1 | * | 3/2002 | Katsandres et al. ......... 709/238 |
| 6,415,205 B1 | * | 7/2002 | Myron et al. ................ 700/275 |

* cited by examiner

Primary Examiner—John Barlow
Assistant Examiner—Xiuqin Sun
(74) Attorney, Agent, or Firm—Fay, Sharpe, Fagan, Minnich & McKee, LLP

(57) ABSTRACT

A method and apparatus for collecting and using data is disclosed. There is at least one sensor that placed within a workspace for sensing vibrations associated with at least one machine operating in the workspace. In addition, there is at least one tag associated with a particular job. The tag indicates the contemporaneous status of tasks relating to the job. At least one processor is in communication with each of the at least one acoustic sensors and at least one tag. This processor receives data relating to acoustic and task status from the at least one acoustic sensor and at least one tag. The acoustic sensor senses vibration and/or sound. Workflow analysis and fault diagnosis and prediction are then based on data collected.

28 Claims, 6 Drawing Sheets

FIG.5A
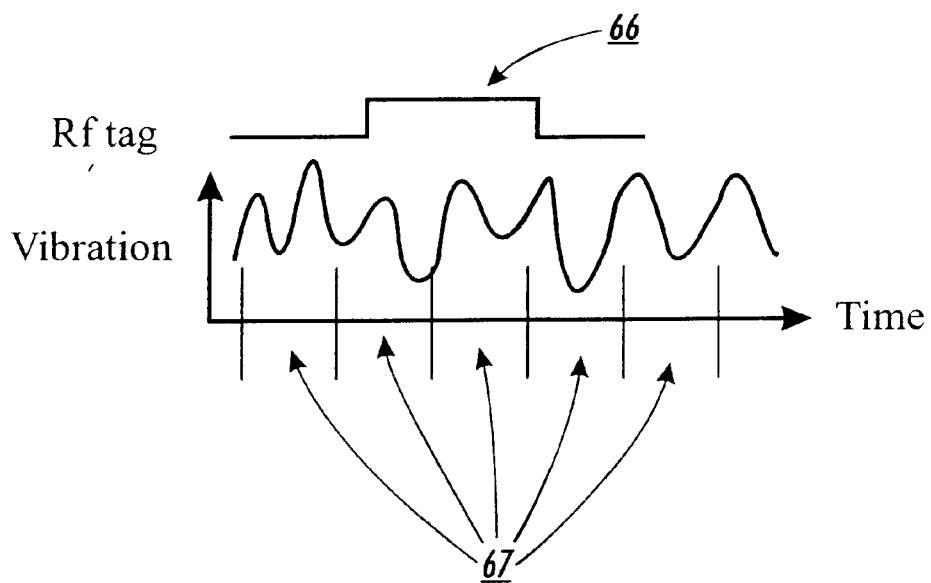
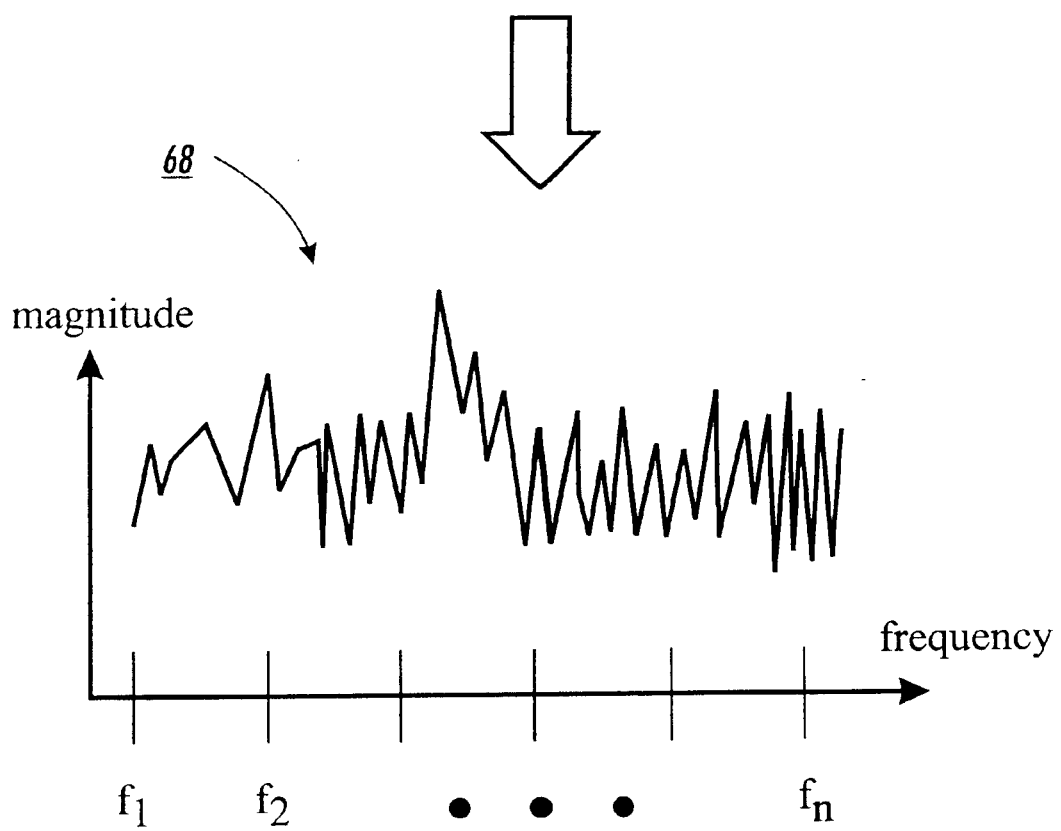
FIG.5B

FIG.5C
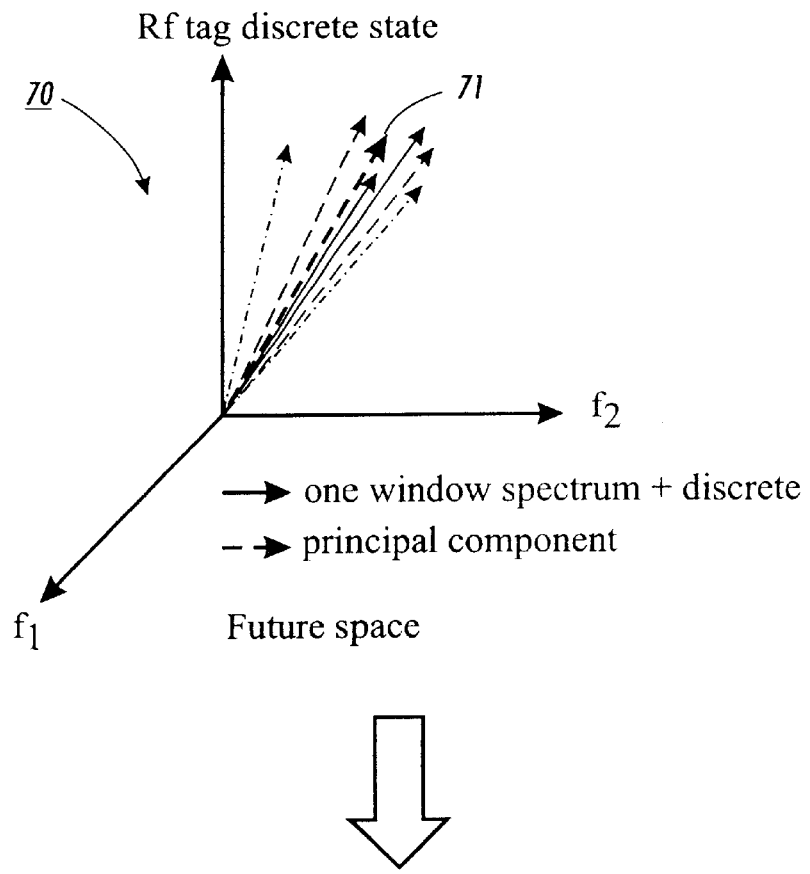
→ one window spectrum + discrete
--→ principal component
Future space
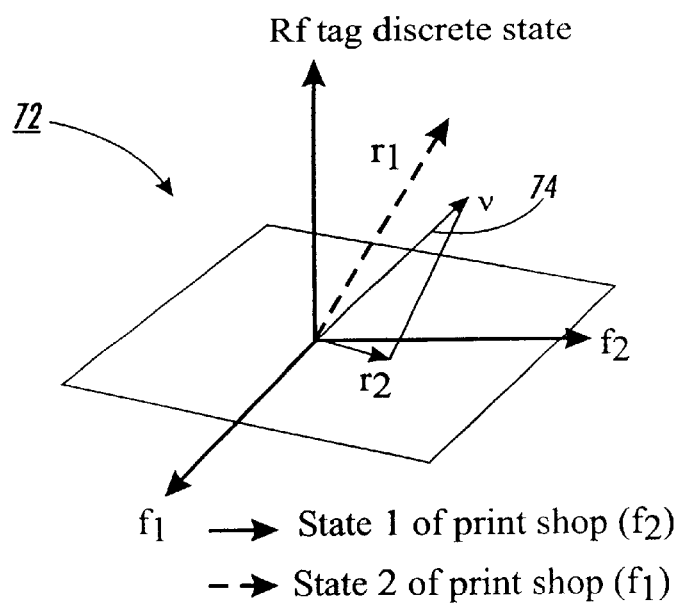
→ State 1 of print shop ($f_2$)
--→ State 2 of print shop ($f_1$)
FIG.5D

SYSTEM FOR SENSING FACTORY WORKSPACE

FIELD OF THE INVENTION

The invention relates to factory/manufacturing processes, and more particularly to a system and method for the collection of data with a view to workflow planning and fault diagnosis.

BACKGROUND OF THE INVENTION

With the advent of modern lean manufacturing methods, information processing systems, and the Internet, factories or manufacturing facilities are increasingly gaining the ability to acquire, process, and utilize workflow information. For example, most current printshops consist of isolated machines that do not interface well with internal computer systems. Companies often organize these machines in patterns and arrays within a factory workspace that are not optimal from an efficiency and cost standpoint. For instance, the machines require operators to load/unload jobs, monitor job progress, pass jobs on to a next station, and commence a new job. In-between each of the steps, each job is commonly stored in storage areas awaiting the next step of the job. An experienced manager plans and schedules each machine. Typically, a job card that specifies the steps needed to complete the job, the steps already completed, and the order of the steps, accompanies the job. An operator manually adds the data regarding job completion to a job card, or sometimes simply holds such information in his or her memory for a period.

A disadvantage of conventional printshops is that excess inventories caused by buildups between job steps increase overall job costs. The lack of real time information concerning the contemporaneous state of the machines and the jobs leads to less efficient plant utilization, and hence lower productivity. Companies cannot easily split large jobs into more efficient smaller job lots because of the difficulty in tracking the more numerous smaller job lots. If a mistake occurs, the typical result is to discard an entire job lot. The larger the job lot size, the greater the potential for substantially more waste.

Companies often organize conventional printshops in a manner that is functionally independent of the print job complexity, the print job mix, and the total volume of print jobs passing through the system. Most commonly, companies group equipment together on a factory floor that is somewhat related. This results in a grouping of all printing equipment in a single locale. Accordingly, all finishing equipment is in a separate single locale. In other words, conventional printshops typically organize resources into separate departments, each department corresponding to a particular process or operation performed in completing a print job.

When a specific print job arrives, the print job sequentially passes through each department. Once a first department completely processes the print job, the print job enters a queue for the next department. The queue is sometimes in the form of a temporary storage facility. This process continues until the print job makes its way through each department.

SUMMARY OF THE INVENTION

For the foregoing reasons, there exists in the art a need for a system and method for collecting data to analyze workflow and diagnose potential problems and machine faults within a production/manufacturing process, such as a printshop.

In accordance with the present invention, a system for collecting data is provided having at least one acoustic sensor that is placed within a workspace for sensing acoustic signals, such as sound or vibrations, associated with at least one machine operating in the workspace, and at least one tag associated with a particular job. The tag indicates the contemporaneous status of tasks relating to the job. The system also includes a processor in communication with each acoustic sensor and tag for receiving data relating to acoustic and task status.

In a common arrangement, there is a plurality of machines located within the workspace area. There is a plurality of acoustic sensors placed in a specified array throughout the workspace. Additionally, there is at least one tag placed in association with each of the plurality of jobs being processed through the workspace.

Each of the sensors can take the form of a microphone, with a wired or wireless connection to the processor. The tag can be a passive RF tag, an active tag, infrared tag, or bar code. In order to read the particular form of tag, a corresponding tag reader is placed within the workspace. The tag reader reads data provided by each tag and communicates the data to the processor. The tag can also be a sonic tag readable by each of the acoustic sensors within the work place.

The processor can be in the form of a computing apparatus that is connected by a telephone line or by a wireless connection to a computer network. The computer network can be a local area network and/or the Internet.

BRIEF DESCRIPTION OF THE DRAWINGS

The aforementioned features and advantages, and other features and aspects of the present invention, will become better understood with regard to the following description and accompanying drawings, wherein:

FIGS. 5A through 5D illustrate a stepwise refinement of data collected according to one aspect of the present invention.

DETAILED DESCRIPTION OF THE INVENTION

Figure 1:
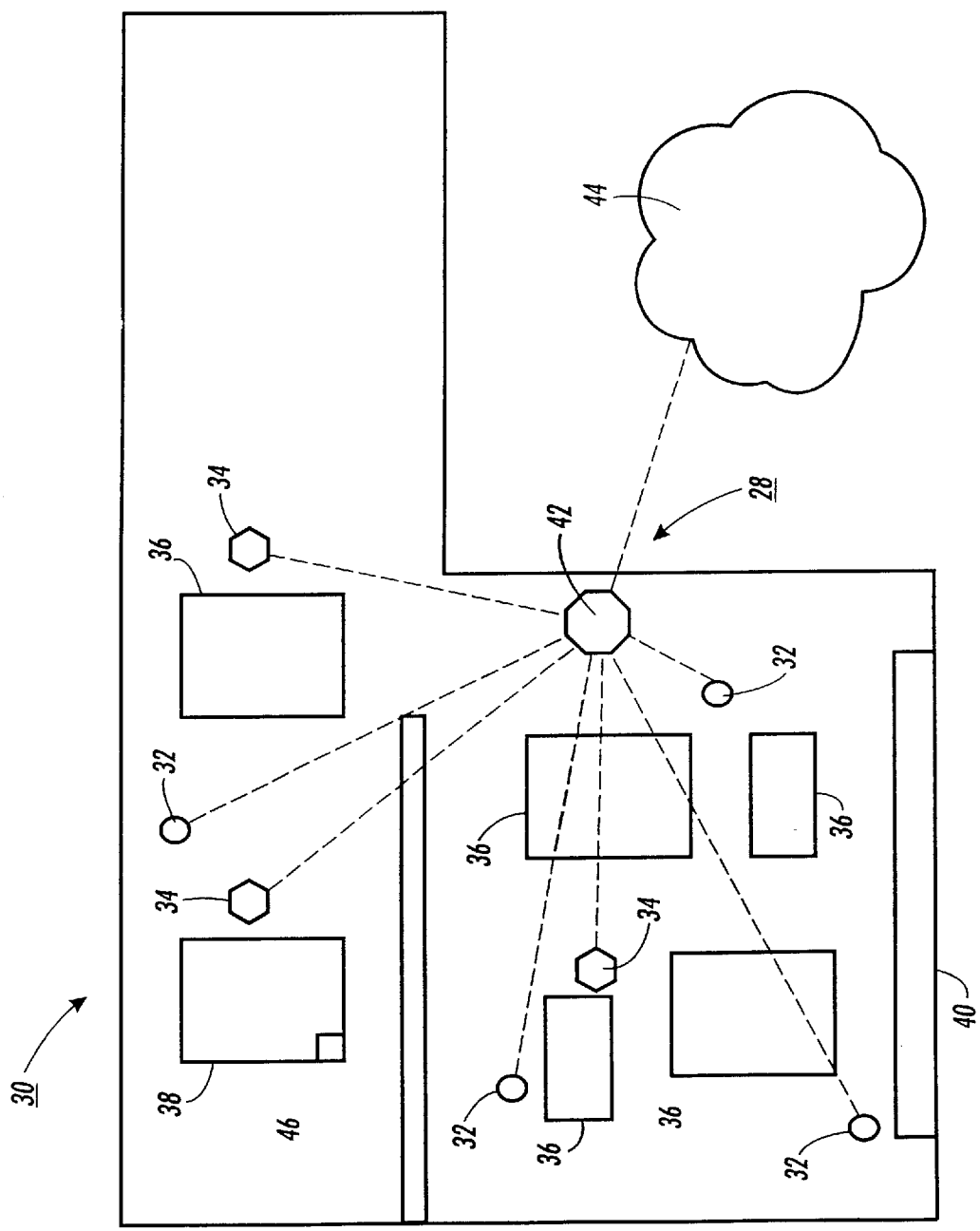
FIG. 1 is a diagrammatic illustration of an acoustic monitoring system in combination with a tag system for use in a printshop according to teachings of the present invention.

The present invention generally relates to the collection of data for analysis of workflow and machine diagnosis within a factory or manufacturing process, such as a printshop. For purposes of illustration, a printshop forms the foundation for the description of the manufacturing process. However, the applicant intends that the teachings of the present invention extend beyond printshops to a number of different manufacturing processes.

According to one aspect of the invention, an array of remote acoustic sensing equipment augments a job tracking system based on bar code or RF tag recognition to determine real time characteristics of printshop workflow. Observation of the various job-processing events within the printshop can determine workflow practices. The combined system can record commencement of a number of jobs, along with the duration of each job, completion times of various intermediate steps of each job, faults and down time of various machines within a workspace, and delays between an end and start of each step. The job tracking system portion of the present invention can acquire the total job mix and distribution of job resource requirements. Each job of a plurality of jobs has associated therewith a tag. As the job starts and stops, the job tag associated with the job records the desired task data. The tag system can be in the form of a bar code scanner, or RF tag system, to minimize the load imposed on operators. The tag reading systems accurately determine the identity of each job and the start and stop of each job throughout the printing process.

Referring now in detail to the drawings wherein like parts are designated by like reference numerals throughout, FIGS. 1 through 5 illustrate an example embodiment of a system for factory workflow planning and fault diagnosis according to several aspects of the present invention. Although the specification describes present invention with reference to the example embodiments illustrated in the figures, it should be understood that the present invention can take many alternative forms. In addition, any suitable size, shape, or type of elements or materials can be substituted for those disclosed herein.

FIG. 1 illustrates an acoustic monitoring system 28 for use in a printshop in accordance with the teachings of the present invention. The acoustic monitoring system 28 is shown in conjunction with a printshop 30. Individual and/or groups of acoustic sensors 32 are positioned throughout the printshop 30. In general, each sensor 32 is primarily sensitive to a particular machine 36 or group of machines. There can be some intentional overlapping coverage of the sensors 32 to account for error and location issues.

The term acoustic sensor is intended to include any sensor suitable for sensing acoustic signals, such as vibration or sound. The acoustic sensor 32 can be strictly a vibration sensor, which senses vibrations translated through the floor of the printshop 30 from a particular machine 36. Alternatively, the acoustic sensor 32 can be one that solely senses sound signals. In such an instance, the sensor 32 is a microphone. In yet another construction, the acoustic sensor 32 can sense both vibration and sound signals simultaneously. Examples of other suitable types of acoustic sensors include an accelerometer, piezoelectric transducer, optical sensor, and capacitive sensor. The acoustic sensors 32 sense one or both of sound and vibration signals, depending on the particular configuration and sensing technology utilized.

The printshop 30 represents a room or group of rooms forming a workspace in which there is a collection of machinery. The printshop 30 takes raw materials such as ink, and paper, and performs a variety of tasks to transform the raw materials into a printed product. The printshop 30 represents an example type of workspace in which the present invention can be utilized.

Each acoustic sensor 32 senses one or more acoustic signals. The sensor 32 collects the acoustic data and conveys the data to a processor 42. Methods for compressing the data collected by the acoustic sensors 32 prior to shipping the data over a wired or wireless channel to a processor 42 are known and can be employed as desired. The processor 42 then processes the data from each of the acoustic sensors 32.

In addition, tag readers 34 can be strategically located throughout the printshop workspace. Each of the tag readers 34 reads tags 50, see FIG. 2, from each of a plurality of jobs, and communicates task data collected from each tag 50 to the processor 42.

The term job as used herein represents a series or collection of one or more tasks required to transform one or more raw materials or other supplies into a final, desired, product or result. A completed job is an achieved result. According to one practice, the job is a print job. A tag 50 is a device that contains information about a particular job. The tag 50 most typically contains information such as a description of the job, what steps need to be carried out, what steps have been completed, and any other desired status information, and can have any suitable shape and size. Technologies that can form the tag 50 include an RF-tag, a bar code tag, sonic tag, or an infrared transmitting tag.

The tag reader 34 is a device that reads the task data contained within the tag 50. The tag reader 34 is complimentary in technology to the technology of the particular tag reader 50. For example, if the tag 50 is an RF-tag, then the tag reader 34 will receive an RF signal from the tag 50 containing the task data. If the tag 50 is a bar code, the tag reader 34 scans the tag 50 with an infrared scanner to obtain the task data. If the tag 50 emits an infrared signal, the tag reader 34 receives the infrared signal and the task data contained therein. Any number of different technologies are available for carrying out these data transmissions, as understood by one of ordinary skill in the art.

The processor 42 can be in the form of a computing apparatus, which connects via a telephone line or wireless link to a network 44. The phrase "computing apparatus" as used herein refers to a programmable device that responds to a specific set of instructions in a well-defined manner and can execute a prerecorded list of instructions. The computing apparatus includes: a form of memory, which enables the computing apparatus to store, at least temporarily, data, information, and programs (e.g., RAM or ROM); a mass storage device for substantially permanently storing data, information, and programs (e.g., disk drive or tape drive); an input device through which data and instructions enter the computing apparatus (e.g., keyboard, mouse, or stylus); an output device to display or produce results of computing actions (e.g., display screen, printer, or infrared, serial, or digital port); and a central processing unit including a processor for executing the specific set of instructions.

The network 44 can be a local area network, (LAN), WAN, or can be any other type of network such as an intranet, extranet, as well as the Internet. The acoustic monitoring system 28 monitors machines that are not specifically covered by the tag 50 and tag reader 34 system. The network 44 ultimately communicates data collected by the acoustic sensors 32 and tag reader 34 to a desired destination for analysis.

Figure 2:
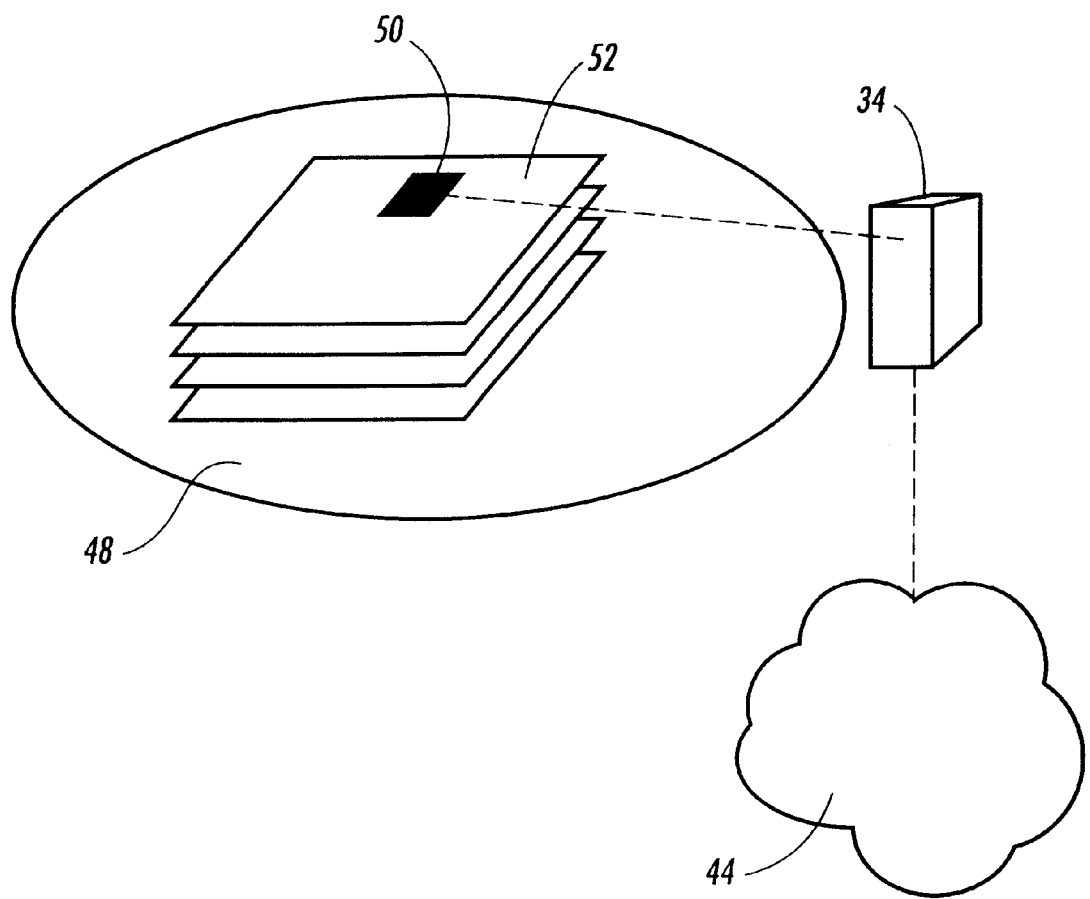
FIG. 2 is an illustration of an RF tag monitoring system employed in the system of FIG. 1 according to the teachings of the present invention.

Each of the tags 50, as illustrated in FIG. 2, can attach either to a job card associated with a particular job, or directly to a first sheet of a print job. Depending on the technology of the particular tag, some tags can pass through many of the printing processes. The tags can be passive RF tags, which do not require an internal source of energy, or active RF tags, which require an energy source. A tag reader 34 can be employed to read data or information from or stored within the tags 50. For example, the tag reader 34 can provide an RF field which powers the circuits within the RF tag causing it to reveal its identity, read stored data within the tag 50, and store new information within the tag 50. A single tag reader 34 can interrogate multiple RF tags 50 that are within a particular tag reader 34 active area 48, spatially located to within one meter.

Figure 3:
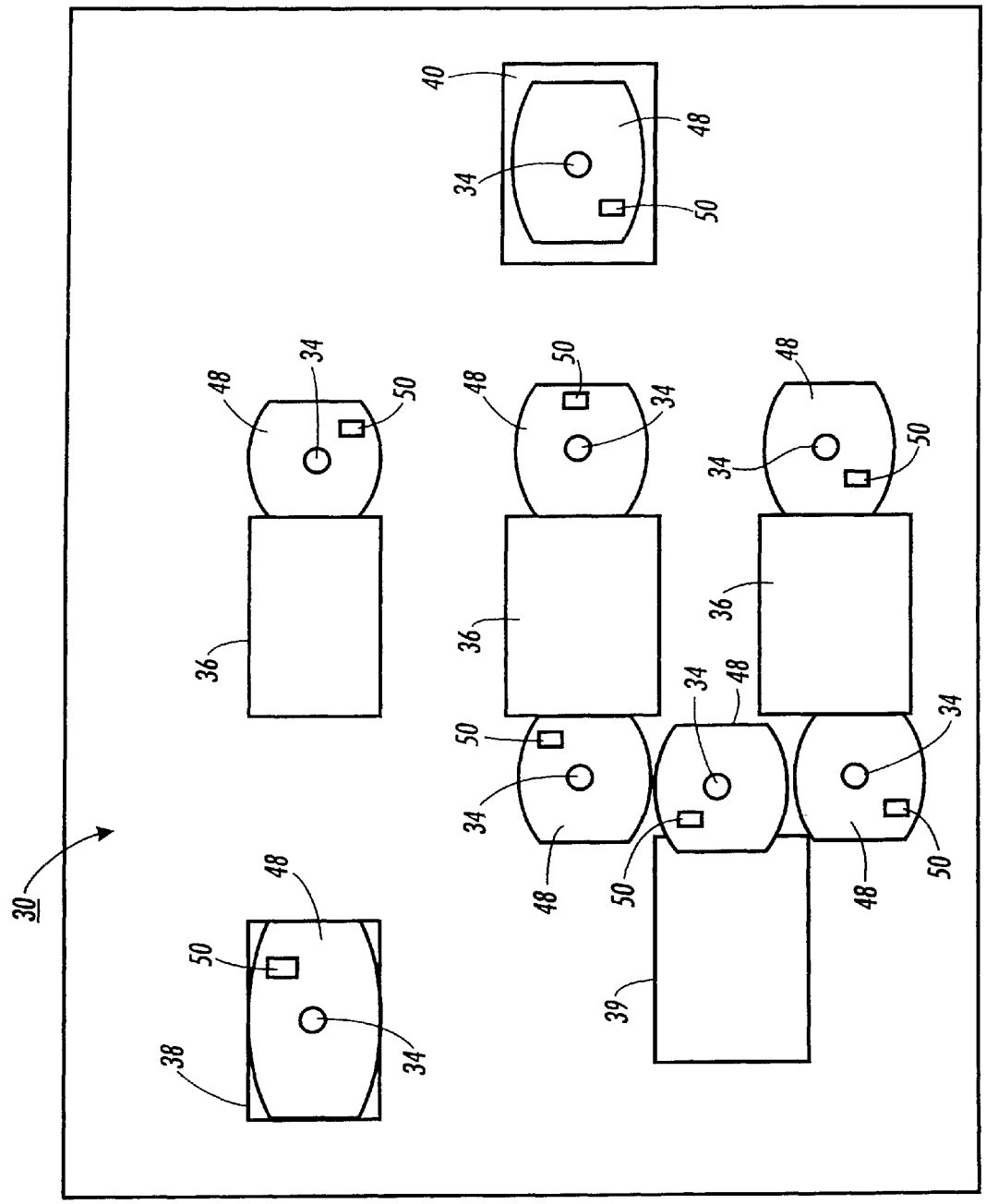
FIG. 3 is an illustration of an exemplary placement of components according to one aspect of the present invention.

The tag readers 34 mount at, for example, each machine 36, each media storage 38 area, each intermediate storage 39 area, and in a shipping and receiving 40 area as illustrated in FIG. 3. Each tag reader 34 requires power and can establish the identity of a particular tag 50, read any stored information on the tag 50, and write new information to the tag 50. The tag readers 34 can be self-operating in that they constantly monitor the presence of all tags 50. The tag readers 34 each have their own active area 48 within which a tag 50 must be in order for the tag reader 34 to read the tag 50. The operator, therefore, can handle a job as before without any additional training, and the system notes the location, time, and any stored information such as job history, task status, or upcoming sequences.

The wireless communication between the acoustic sensors 32 and the processor 42, and the individual tags 50, the tag reader 34, and the processor 42, can be in the form of, for example, an Ethernet, RS-488, or wireless connection. The wireless connection is preferred in instances where disruption of existing printshop 30 processes must be kept to a minimum or when there is a requirement for rapid installation.

Figure 4:
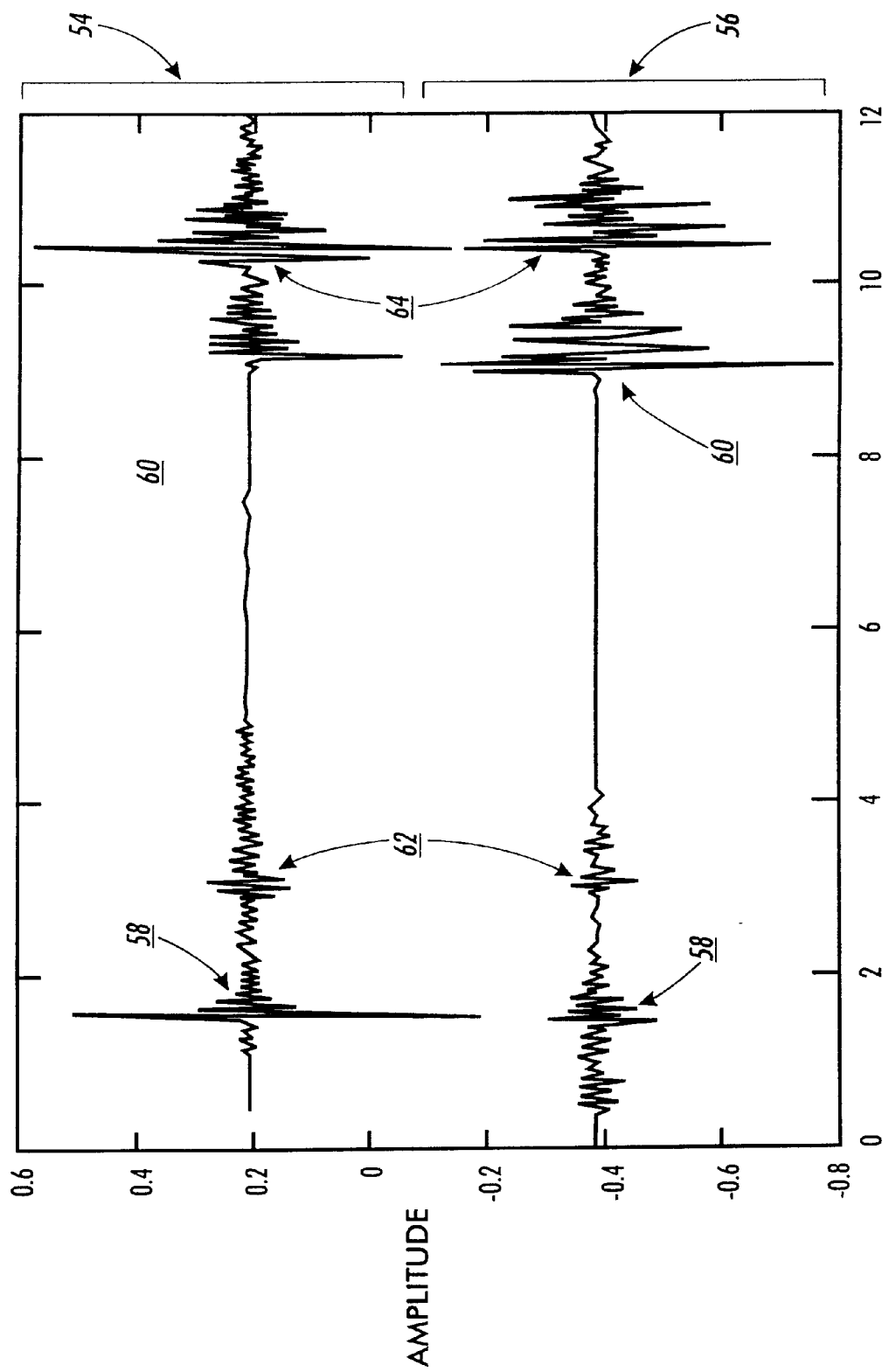
FIG. 4 is a graph of example resulting acoustic signatures generated in a printshop according to one aspect of the present invention.

A calibration phase is necessary to establish a baseline to compare against the data collected, once the hardware setup is in place. FIG. 4 illustrates example acoustic signatures for two different sensors 32 and two different machines 36. Signatures resulting from the startup of various machines 36, such as feeding mechanisms, motors, solenoids, etc., at the start of a job 52 yield characteristic startup signatures. Correspondingly, machine 36 operations, such as shutdown, lead to additional characteristic shutdown signatures. For example, as illustrated, sensor#1 acoustic signature 54 represents a Machine#1 startup 58, and a Machine#1 shutdown 60. One can readily observe the variations in the acoustic signature. Also illustrated in the acoustic signature 54 is Machine#2 startup 62 and Machine#2 shutdown 64. Sensor#2 acoustic signature 56 illustrates the acoustic signature of a second sensor. As can be seen, the variations in acoustic signature for Machine#1 startup 58, Machine#1 shutdown 60, Machine#2 startup 62, and Machine#2 shutdown 64, are visible in this sensor#2 acoustic signature 56. However, the amplitude of the variations differs between sensor#1 acoustic signature 54 and sensor#2 acoustic signature 56 for the same machine operation occurrences. The difference in amplitude occurs due to different placement of each sensor within the printshop 30.

A collection of the baseline data takes place during the calibration phase by actuating each machine 36 within a printshop 30 individually, and cycling through distinct states of operation, such as startup, shutdown, different modes of proper operation, and failure. The acoustic characteristics of each state of each machine 36 are recorded. Then, acoustic data from all machines 36 within the printshop 30 in operation including failure states are acquired along with identified states and additional tag 50 data.

Various statistical analysis methods such as those illustrated in FIGS. 5A through 5D can reduce the measured sensor acoustic signatures 54 and 56 to lower dimensional state feature vectors. The illustrated graph 66 plots the RF tag data and the acoustic data for a particular known state of the printshop, according to one example series of data refinements (FIG. 5A). The graph 66 introduces individual time windows 67 to enable Fourier transforms. A frequency spectrum plot 68 graphically illustrates Fourier transforms executed on each time window 67 segment (FIG. 5B). Then, utilizing each time window 67 spectra, a feature space plot 70 characterizes feature space of the spectra and RF tag by principle component analysis (FIG. 5C). This yields a principle component vector 71 that characterizes the known state of the print shop. This vector is vector r1 in graph 72. If the printshop changes states to a new state, the vibration and RF tag data is again analyzed as in FIGS. 5A–C to find principle component vector r2 in FIG. 5D. Similarly, for any number of states, a vector in the space of graph 72 is found for any operating state of the printshop. When the printshop is under normal operation, the vibration and RF tag information is measured as in FIGS. 5A–C, giving rise to a vector 74 in graph 72 in FIG. 5D. This vector characterizing the unknown printshop states is projected onto the various state vectors such as r1 and r2. The probability of being in the state represented by vectors r1 and r2 for example is proportional to the projection of 74 onto vectors r1 and r2 respectively. As the printshop operates, the vibration frequencies and RF tag states change thereby causing the vector 74 in 72 to move with time.

Based on then known states of the printshop 30, the illustrated acoustic monitoring system 28 calibrates the printshop state classification in the feature space to minimize the probability of cross validation classification error. Once the acoustic monitoring system 28 is able to correctly identify the state of the printshop 30 during the calibration phase, standard printshop 30 operations further test the acoustic monitoring system 28. If the acoustic monitoring system 28 successfully identifies the state of the printshop 30, the acoustic/tag system is ready for use. Otherwise, the calibration phase continues until the error rate achieves an acceptable predetermined standard. If during printshop operation, a machine experiences a failure, an effort is made to identify the acoustic signatures associated with the failure and the precursors to this failure.

The acoustic monitoring system 28 can disambiguate different machines 36 and states utilizing data from several sensors. In addition to a primary target machine 36, an acoustic sensor 32 will likely record job signatures of other machines 36, some of which may be of the same type, within its sensing sphere. This was illustrated in FIG. 4 and correspondingly discussed. In order to correctly identify the states of the target machine 36 despite the interference of other machines 36, it is desirable to segment relevant events of the machine 36 from the signal before applying these state identification process set during the calibration phase. Utilization of a job event model can aid the segmentation. Further, phase lags for a given event arriving at spatially separated sensors 32 can also spatially localize the source of the event, and identify the particular machine 36. On occasion, interfering events may overlap in time with the target event. In such an instance, the data is likely invalid. However, it is possible to sometimes recover individually corrupted job data points by interpolation.

In addition to the aforementioned calibrating procedures, a high level model such as a discrete event model of workflow can be utilized. Such a model assists in fusing tag data with acoustic data, as well as alleviating signal event segmentation problem. The model can include a representation of job or job lot starts, job sequences, and can also include the approximate length of time at each step. Only key spatial and temporal segments of the acoustic data are necessary to reduce to a feature space, based on the knowledge of the event sequence. In the instance where sound emitting devices replace RF tags, the event identification problem is greatly simplified by utilizing the uniqueness of signal pitch.

In operation, the printshop 30 executes the workflow according to standard practice. When a job 52 starts, the RF (or bar code) reader helps to establish the job identity. The acoustic sensors 32 record the various transitions of the job 52 as it passes through the process, and the processor 42 (or computing apparatus) then identifies the transitions. The computer network 44 passes along the collection of acoustic events and RF tag events for remote analysis. Workflow models and the collected data help to identify the sequence of events for each job 52 lot. If a machine 36 fails, an operator can scrutinize the acoustic record for precursors correlating with an enhanced probability of failure. The operator can then use these precursor signals to adjust the workflow during operation to optimize efficiency. For example, if a machine 36 has an increased likelihood of failure, the operator can increase buffer sizes and inventory to accommodate the machine failure. The operator can alternatively reroute jobs 52. The operator can then analyze and optimize the workflow for efficiency. Optimal buffer sizes, lot sizes, and work cell arrangements can be found utilizing the data provided by the acoustic monitoring system 28. Within a networked printing environment, the operator can use the machine 36 health data collected from the sensors 32 to adjust parameters of each machine 36, in addition to workflow parameters, to compensate for degradation or failure. For example, a characteristic signature of solenoids used in paper feeding may indicate a delayed paper acquisition, and a control scheduler may utilize the information to readjust the control parameters of the paper path to anticipate the late arrival of papers. This avoids mechanical problems such as jamming. Further, the acoustic monitoring system 28 can also collect image quality information, and/or encode RF tags, and utilize the information in optimizing the machine 36 operation.

Further illustration of efficiencies achievable by embodiments of the present invention is provided below. Two machines 36 process a job 52 in sequence, Machine#1 and Machine#2. The buffer is a storage element with finite capacity. The processing time of each of the two machines 36 is known and is equal in this example. The time required to process a portion of a job 52 is taken as the time unit. For example, Machine#1 is a printer that prints 30 pages in 10 seconds. Machine#2 is a shrink-wrapping machine that shrink-wraps 30 pages in 10 seconds. In this example, the discrete time unit is 10 seconds. During a time unit when a machine is working, it has a probability of "p" to fail. The meantime to failure in working time is "T". Thus, if the printer has a meantime to fail of one paper jam every 180,000 pages, then meantime to failure is 6,000 time units, and the failure probability p is $1/6000$ or 0.00017. During a time unit when a machine 36 has failed, its probability of being repaired during a time unit is "r". Thus, if r=0.1 then t=1/0.1=10 time units (or 100 seconds). Machine#2 shuts down when the buffer is full, Machine#1 shuts down, and when the buffer is empty. The parameters r and p are further used to determine the optimal size of the buffer elements between processes (Refer to "Manufacturing Systems Engineering by S. B. Gershwin, Prentice-Hall Ltd).

According to another aspect of the present invention, the combination of the acoustic sensing with the tag system enables prediction of failure. If failure associates with various acoustic/vibrational signatures, or machine 36 aging accompanies changes in acoustic signatures, this invention can help to readjust workflow based on changed probable failure modes. For example, in the previous example of two machines 36, if Machine#1 is emitting characteristic of an increased probability for breakdown or enhanced aging, the operator can decrease the lot size, increase the initial buffer loading, or reschedule jobs to alternative workflows to avoid the particular machine 36.

Further advantages of the present invention include, for example, there is minimal interference with printshop operation, minimal training requirements, and minimal customer security concerns. The wireless sensor setup is less intrusive to printshop work environments than wired network solutions. This is advantageous when network security is a concern. Separating the wireless network for the workflow identification from other internal intranets, or computer networks, greatly reduces the security concern.

The relative costs of the present invention are low. The present invention does not require interfacing with customer data systems. There is no need for especially trained people to perform additional programming or additional electrical connections. Further advantages include rapid setup, capability for predicted compensation, automatic data acquisition, detailed job completion status data, and cross validation of other workflow data.

Numerous modifications and alternative embodiments of the invention will be apparent to those skilled in the art in view of the foregoing description. Accordingly, this description is illustrative only and is for the purpose of teaching those skilled in the art the best mode for carrying out the invention. Details of the structure may vary substantially without departing from the spirit of the invention, and exclusive use of all modifications that come within the scope of the appended claims is reserved. It is intended that the invention be limited only to the extent required by the appended claims and the applicable rules of law.

What is claimed is:

1. A system for collecting data, comprising:
    at least one acoustic sensor for sensing acoustical signals associated with at least one machine, the at least one acoustic sensor being placed remotely from the at least one machine within a workspace;
    at least one tag associated with a job, said tag indicating a status of tasks; and
    at least one processor in communication with said at least one acoustic sensor and said at least one tag;
    wherein said at least one processor receives acoustical data and task data from said at least one acoustic sensor and said at least one tag and analyzes the acoustical data and/or task data to determine one or more of workflow status, job status, optimal size of interprocess buffers and machine status.

2. The system for collecting data according to claim 1, wherein said acoustic sensor senses at least one of vibration and sound.

3. The system for collecting data according to claim 1, wherein a plurality of machines is contained within said workspace, and a plurality of acoustic sensors is placed in an array throughout said workspace.

4. The system for collecting data according to claim 1, wherein said at least one tag is placed in association with each of a plurality of jobs throughout said workspace.

5. The system for collecting data according to claim 1, wherein said acoustic sensor comprises a microphone.

6. The system for collecting data according to claim 5, wherein said workspace is a printshop and said job is a print job.

7. The system for collecting data according to claim 1, wherein said at least one tag comprises a passive or active RF tag.

8. The system for collecting data according to claim 7, further comprising a passive tag reader to read said task data associated with said at least one passive tag, and communicate said task data to said processor.

9. The system for collecting data according to claim 7, further comprising an active tag reader to read said task data associated with said at least one active tag and communicate said task data to said processor.

10. The system for collecting data according to claim 1, wherein said at least one tag is an infrared tag.

11. The system for collecting data according to claim 10, further comprising an infrared tag reader to read said task data associated with said at least one infrared tag and communicate said task data to said processor.

12. The system for collecting data according to claim 1, wherein said at least one tag is a sonic tag.

13. The system for collecting data according to claim 12, wherein said at least one acoustic sensor reads said at least one sonic tag and communicates said task data to said processor.

14. The system for collecting data according to claim 1, wherein said at least one tag includes a bar code.

15. The system for collecting data according to claim 14, further comprising a bar code reader to read said at least one tag and communicate said task data to said processor.

16. The system for collecting data according to claim 1, wherein said processor is a computing apparatus coupled to a computer network.

17. The system for collecting data according to claim 16, wherein said computer network is the Internet.

18. The system for collecting data of claim 1 wherein at least one of the at least one processors is operative as a classifier for analyzing said acoustical data and said task data to determine a state of at least one of a machine, a task, a plurality of machines and a plurality of tasks within said workspace.

19. A system for collecting data, comprising:
a processor;
a plurality of devices for remotely sensing an acoustic signal, said plurality of devices placed in a workspace for recording acoustical signals emanating from at least one machine in said workspace, said at least one device in periodic communication with said processor; and
a plurality of tags associated with a plurality of jobs, said plurality of tags indicating a status of tasks relating to said plurality of jobs, said plurality of tags in periodic communication with said processor;
wherein said device collects acoustic data and sends said acoustic data to said processor, and wherein said plurality of tags collect task data and send said task data to said processor, said processor storing said acoustic data and said task data for analysis to determine one or more of workflow status, job status, optimal size of interprocess buffers and machine status.

20. The system according to claim 19, further comprising means for transferring said acoustic data and said task data to a second processor, said second processor being adapted to perform at least one analytical calculation.

21. The system according to claim 19, wherein said acoustic data and said task data are sent through a computer network to said second processor.

22. The system according to claim 21, wherein said computer network is the Internet.

23. A method of collecting data in a printshop, comprising the steps of:
arranging at least one remote acoustic sensor in said printshop for sensing acoustical signals radiating from at least one machine in said printshop;
arranging at least one tag associated with a job, said tag indicating a status of tasks;
sensing said acoustical signals with said at least one acoustic sensor;
tracking said status of tasks with said at least one tag;
transferring data acquired from said sensing and tracking steps to a processor; and,
analyzing said data to determine one or more of workflow status, job status, optimal size of interprocess buffers and machine status.

24. The method according to claim 23, further comprising the step of transferring said data through a network to a second processor.

25. The method according to claim 24, further comprising the step of analyzing said data to determine one or more of workflow status, job status, and machine status.

26. A method of analyzing workflow in a workspace, comprising the steps of;
placing a plurality of acoustic sensors in a workspace having machinery;
placing a tag on each of a collection of jobs to be processed by said machinery;
sensing at least one of a vibration and a sound with said plurality of acoustic sensors as said machinery is in process;
recording acoustic data;
sensing said tag and obtaining task data;
recording said task data; and
sending said acoustic data and said task data to a processor for analysis and determination of at least one of workflow conditions, job status, optimal size of interprocess buffers and machine status.

27. The method according to claim 26, further comprising the step of analyzing said data to determine one or more of job status, and machine status.

28. The method according to claim 26 further comprising:
obtaining at least one of a start-up signature, shutdown signature, a normal operation signature and a failure mode signature of said machine.

* * * * *